UNITED STATES PATENT OFFICE.

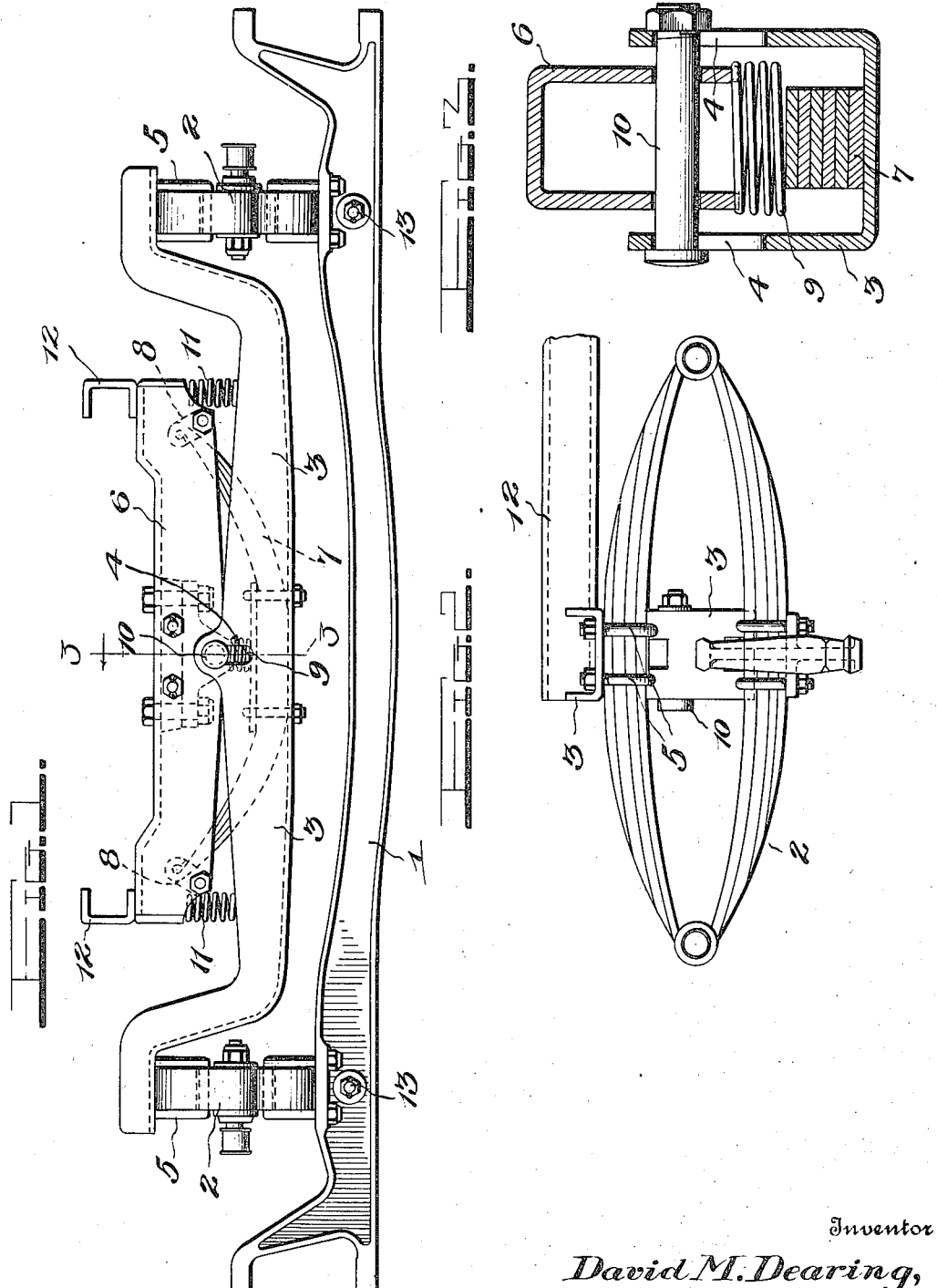

DAVID M. DEARING, OF JACKSON, MICHIGAN.

RUNNING-GEAR FOR MOTOR-VEHICLES.

1,155,801.　　　　Specification of Letters Patent.　　Patented Oct. 5, 1915.

Application filed September 24, 1914. Serial No. 863,368.

*To all whom it may concern:*

Be it known that I, DAVID M. DEARING, a citizen of the United States, residing at Jackson, in the county of Jackson and State of Michigan, have invented certain new and useful Improvements in Running-Gears for Motor-Vehicles; and I do declare the following to be a full, clear, and exact description of the invention, such as will enable others skilled in the art to which it appertains to make and use the same.

This invention relates to improvements in running gears for motor vehicles.

The object of the invention is to provide a pivotal yielding connection between the front end of the supporting frame and the front axle whereby the frame will be prevented from being twisted when traveling over rough roads.

Another object of the invention is to provide a running gear which is exceedingly cheap and simple in construction and one which is formed of a very few parts which are so connected that they are not likely to get out of order and which may be readily used on any of the ordinary makes of automobiles now in use.

With these and other objects in view, the invention consists of certain novel features of construction, combination and arrangement of parts as will be more fully described and claimed.

In the accompanying drawings, Figure 1 represents a front elevation of this improved running gear showing the application of the same. Fig. 2 is an end elevation thereof, parts being broken off. Fig. 3 is a transverse central section taken on the line 3—3 of Fig. 1.

In the embodiment illustrated is shown a channel axle 1 having secured near its opposite ends to the upper face thereof double bowed springs 2 extending in a plane at right angles to said axle. Mounted on these springs 2 is the lower member 3 of this improved front axle connection. This member 3 is here shown in the form of a channel bar, U-shaped in cross section, the flanges of which are increased in width at their center to form a bearing 4, as shown in Figs. 1 and 3. The ends of this bar 3 are offset upwardly and secured to the springs 2 in any suitable manner midway the length of said springs, U-shaped clips 5 being here shown for this purpose. (See Fig. 2.) The bearing 4 is here shown in the form of transversely extending slots formed on the opposed flanges of the bar 3. Pivotally connected with this lower member 3 is an upper member 6 also constructed in the form of a channel bar which is, however, inverted U-shaped in cross section. (See Fig. 3.) The flanges of the bar increase in width at their opposite ends as shown in Fig. 1 to provide housings for a purpose to be described.

A semi-elliptical spring 7 is secured midway its length to the lower member 3 of the axle connection being disposed between the flanges of said member and bolted to the cross bar thereof. (See Fig. 1.) The free ends of this spring 7 extend into the upper member 6 at its opposite ends and are connected thereto by links or shackles 8 to provide for the depression of said spring. A shock absorbing spring 9 is mounted between the pivot 10 which connects the two members 3 and 6 and the upper face of the spring 7 and this spring may be of any desired type being designed to cushion or carry all or part of the weight of the car with which this running gear is connected. While the slotted bearing is not essential, it is found desirable. Cushion springs 11 are arranged between the ends of the member 6 and the lower member 3, but these springs are not essential and may be dispensed with if desired.

The side bars 12 of the frame of the vehicle are shown secured to the opposite ends of the upper axle connecting member 6. (See Fig. 1.)

By arranging the spring 7 with its front ends connected by shackles with the opposite ends of the upper axle member 6, the weight of the vehicle body and running gear is imparted to the axle near its engagement with the supporting wheels, thereby relieving the central portion of the axle from such weight, and thus reducing the possibility of bending or breaking the axle. The pivotal engagement of the lower connecting member 3 with the upper connecting member 6 permits the ends of the axle 1 to rock or move up and down, thus relieving the running gear and operating parts of the vehicle from undue strain. The radius rods 13 are shown in end elevation in Fig. 1, but as they form no part of this invention, they need not be described in detail, it being understood that they have a universal connection with said axle.

I claim as my invention:

1. In a motor vehicle, an axle, a supporting frame, and a pivotal yielding connection between said frame and axle comprising upper and lower members pivotally connected midway their ends, springs disposed between the ends of said lower member and said axle and connected with both of them, and a semi-elliptical spring secured intermediately of its ends to said lower member and having its ends flexibly connected with the ends of said upper member.

2. In a motor vehicle, an axle, a supporting frame, and a pivotal yielding connection between said frame and axle comprising upper and lower members pivotally connected midway their ends, and a semi-elliptical spring fixed to one member and flexibly connected with the other.

3. In a motor vehicle, an axle, a supporting frame, and a pivotal yielding connection between said frame and axle comprising upper and lower members pivotally connected midway their ends, and a semi-elliptical spring fixed to the lower member and flexibly connected with the upper member.

4. In a motor vehicle, an axle, a supporting frame, and a pivotal yielding connection between said frame and axle comprising upper and lower members pivotally connected midway their ends, and a semi-elliptical spring fixed midway its ends to said lower member and having its ends flexibly connected with the upper member.

5. In a motor vehicle, an axle, a supporting frame, and a pivotal yielding connection between said frame and axle comprising upper and lower members pivotally connected midway their ends, and a semi-elliptical spring fixed to the lower members and flexibly connected with the upper member, a shock absorber arranged between the pivot which connects said upper and lower members and said elliptical spring.

6. In a motor vehicle, an axle, a supporting frame, and a pivotal yielding connection between said frame and axle comprising upper and lower members pivotally connected midway their ends, and each composed of channel bars, the ends of said lower member being offset upwardly, springs disposed between said offset ends and said axle, said lower member being U-shaped in cross section and said upper member of inverted U-shape, a semi-elliptical spring secured intermediately of its ends to the inner face of the cross bar of said lower member with its ends extending into said upper member, and links connecting said spring ends with said upper members.

In testimony whereof I have hereunto set my hand in presence of two subscribing witnesses.

DAVID M. DEARING.

Witnesses:
WILLIAM S. McCORMICK,
ARTHUR P. HICKS.